April 9, 1963 J. B. GODSHALK 3,085,187
BATTERY CHARGERS WITH POLARITY CONTROL MEANS
Filed Aug. 11, 1961
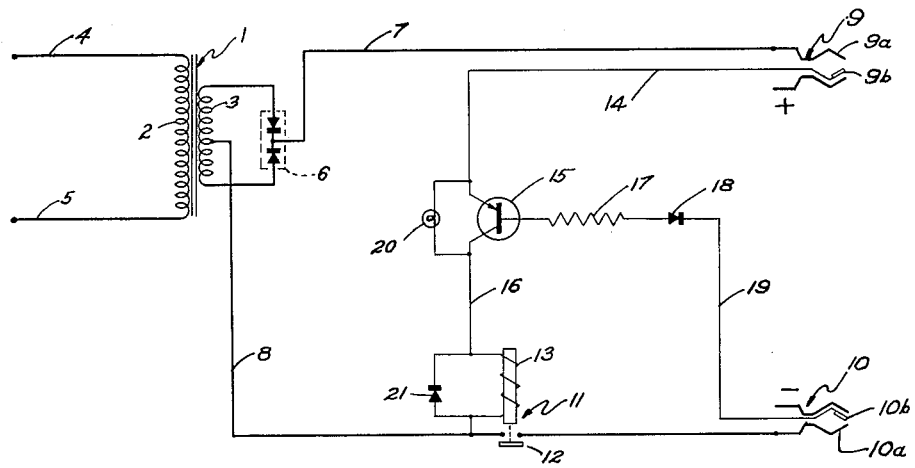
FIG_1_
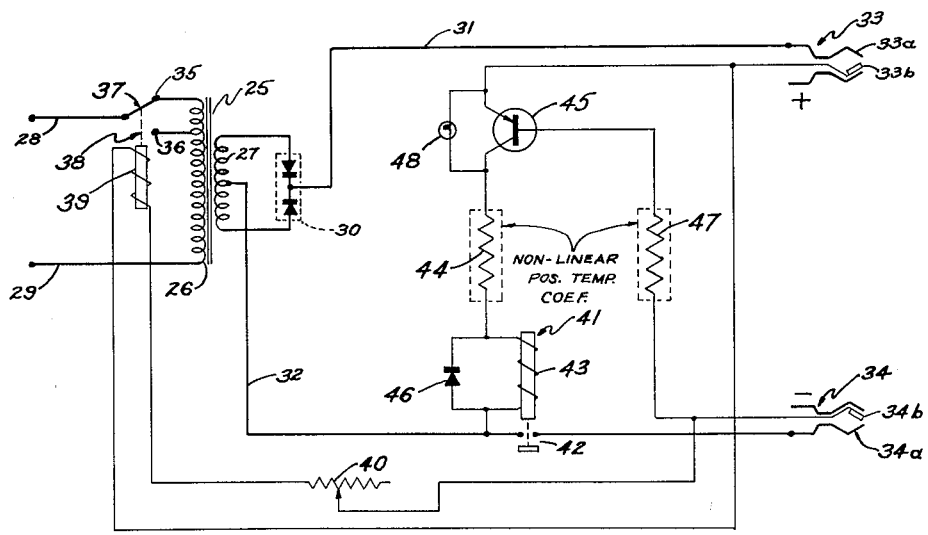
FIG_2_
INVENTOR
JAMES B. GODSHALK
BY *Arnold & Roylance*
ATTORNEYS United States Patent Office 3,085,187
Patented Apr. 9, 1963

3,085,187
BATTERY CHARGERS WITH POLARITY
CONTROL MEANS
James B. Godshalk, Chester Springs, Pa., assignor to Fox
Products Company, Philadelphia, Pa., a corporation of
Pennsylvania
Filed Aug. 11, 1961, Ser. No. 131,006
6 Claims. (Cl. 320—25)

This invention relates to battery chargers and like devices, and more particularly to apparatus which can be used in conjunction with battery chargers or like devices to prevent operation in the event that the device is connected to a battery having polarity opposite to that required for proper operation. This application is a continuation-in-part of application Serial Number 76,382, filed December 6, 1960.

Battery chargers, and particularly those employed in garages and services stations to charge automotive storage batteries, are usually operated by persons having relatively little technical skill. It is accordingly necessary to so construct the battery charger as to guard against improper operation thereof. A particular problem arises because, unless the operator is reasonably skilled, it frequently happens that the battery or batteries to be charged are connected with reverse polarity, that is, with the polarity of the battery being such that the battery aids, rather than opposes, the charging voltage. When a charger is connected properly for charging, the battery potential opposes the charger potential and charging current results when the charger potential exceeds the battery potential. When the charge is connected improperly the battery potential aids the charger potential, resulting in current flow much in excess of designed capacity. Connection of the battery to the charger in reverse can, and in actual practice frequently does, cause severe damage. This excess current flow can burn out the rectifier and transformer and melt the leads of the charger, so that the charger is totally ruined, and may damage the battery terminals beyond repair. Further, assuming that the battery has been in use recently, arcing, which occurs at the battery terminals during connection of the battery to the charger in reverse, can cause explosions by igniting gases in the cells of the battery. If the cell caps are in place when the explosion occurs, the force of the explosion may shatter the battery, damaging it beyond repair and possibly injuring the operator of the charger.

In the past many types of systems have been devised to guard against connection of the battery with reverse polarity. In particular, it has heretofore been proposed to employ relay systems constructed and arranged to automatically correct the polarity of the battery when the same has been connected improperly. Unfortunately, such automatic polarity correcting systems have been quite expensive and, while highly successful, frequently cannot be incorporated in a particular line of battery chargers because of economical considerations.

As disclosed in copending application Serial No. 63,-343, filed October 18, 1960, by James B. Godshalk and Lewis A. Medlar, it has also been proposed to solve the problem of reverse polarity connection by employing a special relay, and control circuit therefor, to prevent completion of the charging circuit unless the same has been connected to a battery with proper polarity for charging. While devices of that type have proved successful, and are advantageous from the standpoint of cost, they involve the distinct disadvantage of requiring a moving contact relay which is subject to failure during use of the charger.

It is accordingly a general object of the invention to devise a battery charger embodying improved, dependable means for preventing operation of the charger when a battery has been connected thereto with reverse polarity.

Another object is to provide, in a battery charger, means preventing the charger from being operated when a battery has been connected with reverse polarity, which means employs an electromagnetic contactor but no additional relays or other switching devices having moving contacts.

Still another object is to provide apparatus which is operative in conjunction with a battery charger or like device to prevent operation of the device in the event that the device is connected to a battery with polarity reverse to that proper for operation.

Yet another object is to provide, in a charger, means which prevents the charger from being operated with an improperly connected battery and which is operable when charging batteries of different voltage ratings.

Another object is to provide apparatus operative to sense the polarity of relatively flat batteries to prevent operation of a battery charger when the charger is connected to a battery having polarity reverse that required for proper operation.

A further object is to provide, in a battery charger having an electromagnetic contactor which must close before charging can proceed, dependable and economical control means operative to accomplish closing of the contactor only when the charging source is activated and a battery is connected thereto with proper polarity for charging, and to prevent closing of the contactor when a battery is connected to the charger with reverse polarity.

In order that the manner in which these and other objects are attained in accordance with the invention can be understood in detail, reference is had to the accompanying drawings, which form a part of this specification, and wherein:

FIG. 1 is a schematic diagram of a battery charger constructed in accordance with one embodiment of the invention;

FIG. 2 is a schematic diagram illustrating a battery charger constructed in accordance with a second embodiment of the invention.

Turning now to the drawings in detail, and first to FIG. 1 thereof, it will be seen that the battery charger here illustrated comprises a transformer 1 having a primary winding 2 and a center tapped secondary winding 3, the primary winding being connectable to a suitable A.C. source (not shown) in the usual fashion via conductors 4 and 5. A center tapped rectifier 6 is connected across the full secondary winding 3, the center tap of the rectifier being connected to one charging lead 7. The other charging lead 8 is connected to the center tap of secondary winding 3.

Leads 7 and 8 are connected respectively to connector clamps 9 and 10 adapted for connection to the terminals of the battery to be charged. Shown diagrammatically here, clamps 9 and 10 are of the pivoted jaw type and are advantageously constructed in the manner described in detail in aforementioned copending application Serial No. 63,343. Thus, clamp 9 includes a conductive jaw member 9a, to which lead 7 is connected, and a second conductive member 9b which is carried by the other jaw member of the clamp in such fashion as to engage the battery terminal but which is electrically insulated from jaw member 9a. Clamp 10 similarly comprises a conductive jaw member 10a, to which lead 8 is connected, and a second conductive member 10b arranged to engage the battery terminal but insulated electrically from member 10a.

A solenoid contactor 11 is employed, the normally open contacts 12 thereof being connected in lead 8. The actuating winding 13 of contactor 11 is connected between leads 7 and 8, via the battery terminal to which clamp 9 is connected. Thus, one terminal of winding 13 is connected to lead 8 between contacts 12 and the center tap of secondary winding 3. The other terminal of winding 13 is connected to conductive member 9b of clamp 9, and hence to the battery terminal to which clamp 9 is connected, via conductor 14, the emitter and collector of a PNP type, high current (2 amp. or more) transistor 15, and conductor 16. Accordingly, since the emitter and collector of transistor 15 are in series between winding 13 and conductive member 9b, winding 13 can be energized, by current from the rectifier 6, to close contacts 12 only if clamp 9 is connected to a terminal of a battery and transistor 15 is conductive.

The base of transistor 15 is connected to conductive member 10b of clamp 10 via a current limiting resistance 17, a diode 18 and conductor 19, diode 18 being poled to oppose current flow when clamps 9 and 10 are connected to a battery with reverse polarity but to allow current flow when the clamps are connected to a battery with proper polarity for charging. The inverse leakage of diode 18 should be less than the base emitter diode leakage of transistor 15.

As indicated, clamp 9 is to be connected to the positive terminal of the battery and clamp 10 to the negative terminal. When the clamps are both properly connected to a battery to be charged, the base of transistor 15 is maintained at a potential sufficiently less positive than is the emitter (by reason of connection of the base to conductive clamp member 10b via resistance 17 and diode 18) to render the transistor conductive. Accordingly, current can flow from rectifier 6 via lead 7, clamp 9 and the terminal to which it is connected, conductor 14, the emitter-to-collector circuit of the transistor, conductor 16, winding 13 of the contactor, and lead 8. The contactor is thus energized from the charging current source, contacts 12 are closed, and charging can proceed. It will be understood that only a small negative potential need be established at the base of the transistor, with respect to the emitter, in order to make the transistor conductive. Hence, the transistor will be conductive, and the contactor energized to allow charging, even if the charger is connected to a substantially "flat" battery, so long as the connection is made with the proper polarity for charging.

Should clamps 9 and 10 be connected to a battery with the polarity opposite to that required for charging, the base of transistor 15 will be more positive than the emitter, so that the transistor is rendered non-conductive. Hence, current from the rectifier cannot energize winding 13 of the contactor, and charging cannot proceed.

In order that the operator can observe that the battery has been connected with reverse polarity, a pilot lamp 20 is connected across the emitter-collector of the transistor. So long as clamp 9 is connected to a battery terminal and transistor 15 is non-conductive, lamp 20 is energized by current from the rectifier, but the resistance of the lamp is such that winding 13 will not be energized.

Since the emitter-base junction of transistor 15 constitutes a diode poled to oppose current flow when clamps 9, 10 are connected to a battery with reverse polarity, the transistor alone, without additional diode 18, is operative to assure that the contactor will not close when the connection to the battery is of the wrong polarity. However, the emitter-base breakdown voltage for normally available transistors is fairly low and, even for a 6-volt automotive storage battery, as much as 6 or 7 volts could be applied in the inverse direction to the emitter-base junction in the event of reverse polarity connection. Diode 18 is accordingly employed to limit the inverse voltage at the emitter-base junction to a safe range.

When winding 13 of the contactor is de-energized, the collapse of the field produced by the winding can generate a substantial voltage which, if applied to the series-connected transistor, would tend to damage the transistor. To avoid this, a diode 21 is connected across the winding of the contactor, the diode being poled to conduct current tending to flow as a result of collapse of the field of the winding but to oppose current flowing from the rectifier to energize the winding. Such connection of the diode 21 provides a closed circuit in which current can be dissipated, without damage to the transistor, when the winding 13 is de-energized.

By employing clamps 9 and 10 of the split clamp type i.e., clamps with two isolated conductive jaw portions, several additional safety features are built into the polarity protection circuit. The emitter-to-collector circuit of transistor 15 is completed across the charger via clamp 9 and therefore the solenoid cannot be energized until a battery is connected so as to complete the circuit between conductive jaw members 9a and 9b. Subsequently, when the clamps are disconnected, the transistor emitter-to-collector circuit is automatically broken and the solenoid de-energized. This arrangement makes it possible to energize the solenoid from the charger potential without having the solenoid "pull in" when the charger is energized with no battery connected thereto. Another feature is that the solenoid will be de-energized if either clamp is disconnected during charging, since the emitter to collector circuit of transistor 15 is broken if clamp 9 is removed and the emitter-to-base circuit is broken if clamp 10 is removed. Thus, protection is present if a clamp should accidentally fall off the battery terminal or be otherwise removed.

The embodiment illustrated schematically in FIG. 2 is in many respects similar to that shown in FIG. 1 except that two non-linear positive temperature coefficient resistances have been added, one in the emitter-to-base circuit of the transistor and the other in the emitter-to-collector circuit of the transistor. These resistances make the polarity sensing portion of the circuit relatively insensitive to voltage changes occurring when charging batteries of different voltage ratings from the same charger, and also make this circuit operable to sense the polarity of extremely flat batteries.

The battery charger here illustrated comprises a transformer 25 having a primary winding 26 and a center tapped secondary winding 27. Primary winding 26 is connectable to an A.C. source (not shown) via conductors 28 and 29. A center tapped rectifier 30 is connected across the full secondary winding 27, the center tap of rectifier 30 being connected to one charging lead 31. The other charging lead 32 is connected to the center tap of secondary winding 27.

Leads 31 and 32 are connected respectively to connector clamps 33 and 34 adapted for connection to the terminals of the battery to be charged. These clamps are of the type previously described in FIG. 1. Thus, clamp 33 includes a conductive jaw member 33a, to which lead 31 is connected, and a second conductive member 33b, which is carried on the other jaw member of the clamp in such fashion as to engage the battery terminal. Clamp 34 comprises a conductive jaw portion 34a to which lead 32 is connected, and a second conductive member 34b arranged to engage the battery terminal. The conductive members 33b and 34b are electrically insulated from conducting members 33a and 34a, respectively.

In order that the battery charger be operable to charge batteries of two different voltage ratings, primary winding 26 is provided with a tap spaced some distance from one end of the winding. One end of the primary winding 26 is connected to stationary contact 35, and the tap of the primary winding is connected to stationary contact 36. Movable contact 37 of relay 38 is biased to normally engage contact 35 and is operative to connect either contact 35 or contact 36 to line 28. The energizing winding 39 of relay 38 is connected directly to conducting member 33b and to conducting member 34b via variable resistance 40. Resistance 40 is adjusted so that, if clamps 33 and 34 are connected to a 6-volt battery, for example, relay 38 will not be actuated, thus causing the A.C. potential on leads 28 and 29 to be applied across the entire primary winding 26, resulting in a proper charging potential being applied to the battery via leads 31 and 32. If clamps 33 and 34 are connected to a 12-volt battery, however, the adjustment of resistance 40 permits sufficient current to pass and energize relay 38 causing the A.C. potential to be applied across only a portion of primary winding 26 resulting in a higher charging potential being applied to the battery via leads 31 and 32.

The normally open contacts 42 of solenoid contactor 41 are connected in lead 32. One end of actuating winding 43 is connected to lead 32 between the center tap of secondary winding 27 and contacts 42. The other end of actuating winding 43 is connected to clamp member 33b, and thus to lead 31 when clamp 33 is connected to a battery terminal, this connection being via impedance 44 and the collector-to-emitter circuit of PNP type, high current (2 amps or more) transistor 45. Impedance 44 is a non-linear positive temperature coefficient resistance such as a type GE 1073 lamp bulb. Thus, when clamp 33 is connected to the terminal of a battery, and transistor 45 is rendered conductive, current flows from line 31 through the transistor and impedance 44 energizing winding 43 to actuate solenoid 41. Impedance 44 tends to maintain the current flow through transistor 45 and winding 43 relatively constant and therefore as the current tends to increase due to higher charging potentials being applied to a battery via leads 31 and 32, impedance 44 increases in resistance tending to decrease the quantity of current flow through the transistor and winding. Thus, this circuit is not materially affected by voltage changes in the leads resulting from charging, for example, 6- and 12-volt batteries from the same charger. The range over which lamp bulbs are effective is somewhat limited and it is doubtful that they could maintain a constant current over more than a 1:2 voltage range, i.e., 6 to 12 volts. If a greater range is required, however, the lamp bulb could be replaced by a suitable constant current ballast tube such as is commercially available under the trade name Amperite.

A diode 46 is connected in parallel with winding 43 and is poled in a direction to provide high impedance to current flow between leads 31 and 32. Diode 46, however, provides a low impedance path for current flow resulting from the collapse of the magnetic field in winding 43, thus eliminating possible damage to transistor 45 resulting from high voltage in the forward direction when the transistor is cut off.

The base of transistor 45 is connected to conducting clamp member 34b via impedance 47 which is a non-linear positive temperature coefficient resistance such as a type GE 433 lamp bulb. Impedance 47 offers minimum resistance to small current flow and therefore increases the sensitivity of the transistor circuit by permitting a relatively small potential difference appearing between clamps 33 and 34 to produce sufficient current flow through the base of transistor 45 to render the transistor conductive. As the current flow through the base of transistor 45 and impedance 47 increases, the resistance of impedance 47 also increases, thereby protecting transistor 45 from excessive current flow as would otherwise result when a large potential is applied between clamps 33 and 34.

In operation, if clamps 33 and 34 are connected to the terminals of a battery having a polarity reverse that required for proper charging, i.e., negative at clamp 33 and positive at clamp 34, transistor 45 is not rendered conductive since the base of the transistor is positive with respect to the emitter. An indicating lamp 48 is connected in parallel with the emitter-to-collector circuit of transistor 45 and is illuminated under these circumstances, indicating that the clamp connection is improper. If clamps 33 and 34 are connected to a battery with the proper polarity, a few tenths of a volt difference between clamps 33 and 34 produces sufficient current flow through the emitter-to-base circuit of transistor 45 and impedance 47 to render the transistor conductive, thereby permitting current flow through the emitter-to-collector circuit of transistor 45 and through winding 43 to actuate solenoid 41 and close contacts 42. If higher potentials are applied between clamps 33 and 34, the resistance of impedance 47 increases to prevent excessive current flow through the emitter-to-base circuit of the transistor. Thus, impedance 47 increases the sensitivity of the circuit to small voltages of the correct polarity while still providing the same protection from excessive current flow, resulting from higher potentials being present at the clamps, as could be achieved by a fixed resistance such as resistance 17 in FIG. 1. It should also be noted that the base circuit of transistor 45 in FIG. 2 does not include a diode such as diode 18 in FIG. 1. In many instances, the maximum reverse polarity potential contemplated does not exceed the inverse breakdown potential of the transistor's emitter base diode and therefore an additional diode is not required in the base circuit.

While advantageous embodiments have been chosen for illustrative purposes, it will be obvious to those skilled in the art that various changes and modifications can be made without departing from the scope of the present invention. In particular, it is obvious that the transistors could easily be replaced by equivalent electric discharge devices, such as vacuum tubes or thyratrons. Changes in the circuitry necessary to accommodate these components would be a matter of mechanical skill to one skilled in the art of battery chargers. The invention is pointed out in more particularity in the appended claims.

What is claimed is:

1. In a battery charger, the combination of a source of charging potential; a pair of charging leads connected to said source and each provided with a connector for connection to a terminal of the battery to be charged; and automatic means for activating the charger only when said connectors are connected to a battery with that polarity proper for charging of the battery, said automatic means comprising a contactor having contacts and a winding for actuating said contacts, said contacts being connected in one of said leads; first circuit means connecting said winding to said source; a transistor operatively connected to establish energization of said winding via said first circuit means when said transistor is in a given operative state; and second circuit means connected to at least one of said connectors and said transistor and being operative to control the operative state of said transistor in accordance with the polarity present at the connectors when connected to a battery, said second circuit means including a serially connected non-linear impedance providing increased resistance as current flow in said second circuit means tends to increase.

2. A polarity sensitive circuit for preventing improper connection of a battery servicing device to a battery being serviced via a pair of connecting leads, the combination of a transistor having an emitter, a collector and a base element, a contactor having normally open contacts and a winding for actuating said contacts to a closed position, said contacts being connected in one of the leads, a first non-linear positive temperature coefficient impedance, first circuit means so connecting the emitter-collector circuit of said transistor, said winding and said first non-linear impedance in series and between the connecting leads that said winding is energized from the battery servicing device via the connecting leads when said transistor is conductive, a second non-linear positive temperature coefficient impedance, and second circuit means so connecting said base element to one of the leads through said second non-linear impedance that said transistor is rendered conductive only when the leads are connected to a battery of the proper polarity.

3. A polarity sensitive circuit in accordance with claim 2 further including a semiconductor diode connected across said winding to provide a conductive path for current flow when the magnetic field of said winding collapses.

4. A polarity sensitive circuit for connecting a source of potential to a battery via a pair of leads only when the leads are connected to a battery of the proper polarity, comprising a contactor having a set of contacts connected in one of the leads and a winding for actuating said contacts, automatic means for energizing said winding when the leads are connected to a battery of proper polarity and comprising, a transistor, a first non-linear impedance, first circuit means including said transistor, said first non-linear impedance and said winding for so connecting same to a source of potential so that said winding is energized with substantially constant current regardless of variations in the potential from said source when said transistor is conductive, a second non-linear impedance, and second circuit means for rendering said transistor conductive when the leads are connected to a battery of proper polarity and including said second non-linear impedance so connected that said transistor can be rendered conductive in response to minimum battery potentials of the proper polarity and so connected to provide current limiting protection if more substantial battery potentials are present.

5. In a polarity responsive device, the combination of an electromagnetic relay device having an actuating winding, and an associated set of contacts connectable in a circuit for selectively connecting a battery servicing device to a battery being serviced;

a control circuit for selectively controlling energization of said actuating winding and comprising a transistor connected to control current flow through said actuating winding in accordance with the conductive state of said transistor, a positive temperature coefficient impedance device, and circuit means connectable to sense the polarity of the battery being serviced, and including said impedance device and said transistor interconnected such that, said control circuit permits energization of said actuating winding only when a predetermined battery polarity is sensed, and the sensitivity of said control circuit to the potential of the battery is controlled by said positive temperature coefficient impedance device in accordance with the magnitude of battery potential of said predetermined polarity.

6. A device in accordance with claim 5 wherein said transistor has an emitter, a collector and a base element, and wherein said positive temperature impedance device is connected to said base element.

References Cited in the file of this patent

UNITED STATES PATENTS

| | | |
|---|---|---|
| 2,086,910 | Hansell | July 13, 1937 |
| 2,683,850 | Weber et al. | July 13, 1954 |
| 2,766,418 | Rice | Oct. 9, 1956 |
| 2,885,623 | Stawfenberg | May 2, 1959 |
| 2,962,603 | Bright | Nov. 29, 1960 |
| 3,051,887 | Lind | Aug. 28, 1962 |

FOREIGN PATENTS

| | | |
|---|---|---|
| 289,939 | Great Britain | May 3, 1928 |

OTHER REFERENCES

"Basic Theory and Application of Transistors," U.S. Army Technical Manual 11–690, March 1959, pp. 98 and 191.